No. 680,247. Patented Aug. 13, 1901.
A. HART.
MOWER.
(Application filed June 29, 1891.)
(No Model.) 2 Sheets—Sheet 1.

Witnesses: Inventor
C. H. Emery Alfred Hart
Ralph Vandyke By Bond & Adams
Attys.

No. 680,247. Patented Aug. 13, 1901.
A. HART.
MOWER.
(Application filed June 29, 1891.)
(No Model.) 2 Sheets—Sheet 2.
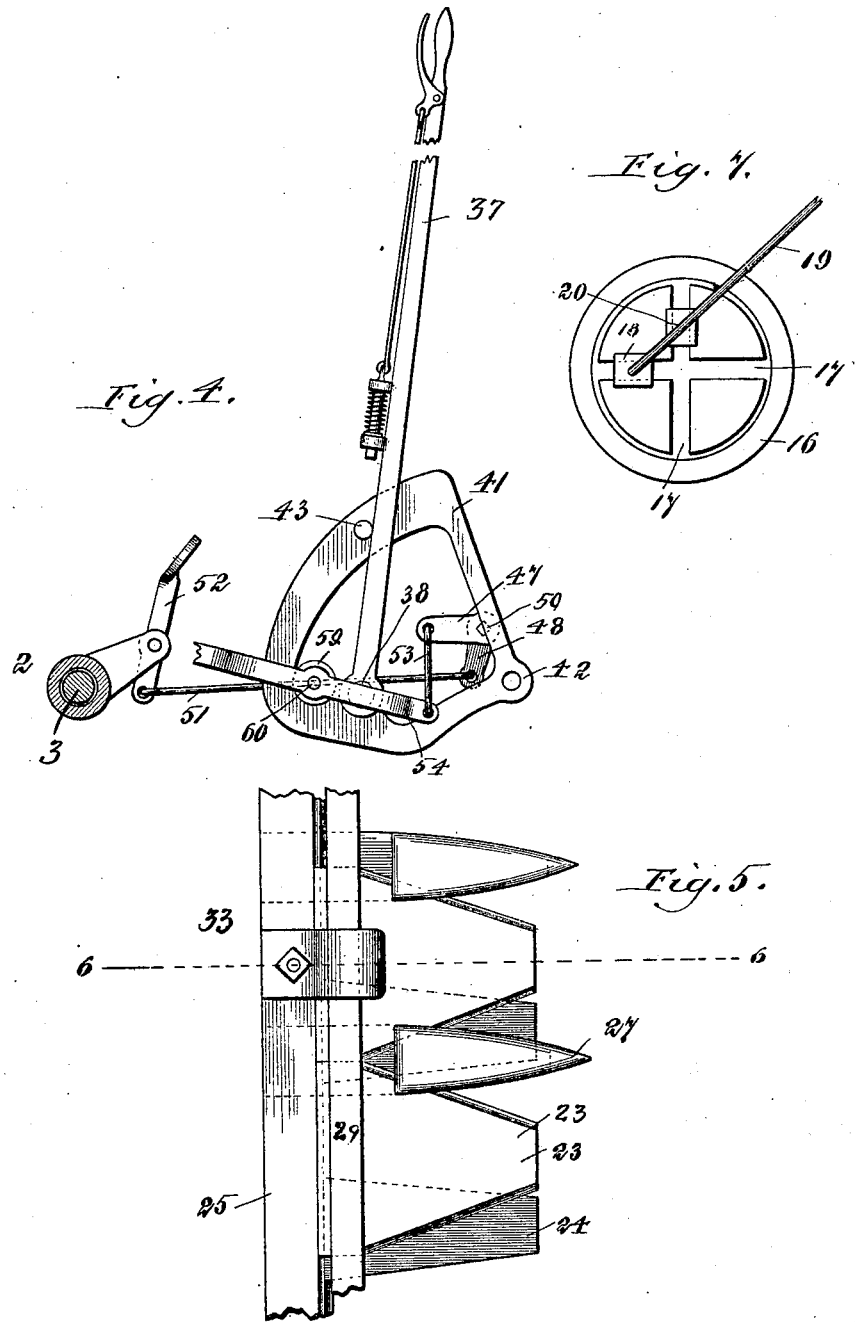
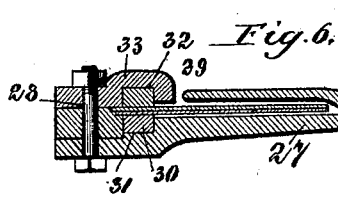

UNITED STATES PATENT OFFICE.

ALFRED HART, OF HARVEY, ILLINOIS.

MOWER.

SPECIFICATION forming part of Letters Patent No. 680,247, dated August 13, 1901.

Application filed June 29, 1891. Serial No. 397,912. (No model.)

*To all whom it may concern:*

Be it known that I, ALFRED HART, a citizen of the United States, residing at Harvey, in the county of Cook and State of Illinois, have invented certain new and useful Improvements in Mowers, of which the following is a specification, reference being had to the accompanying drawings, in which—

Figure 1:
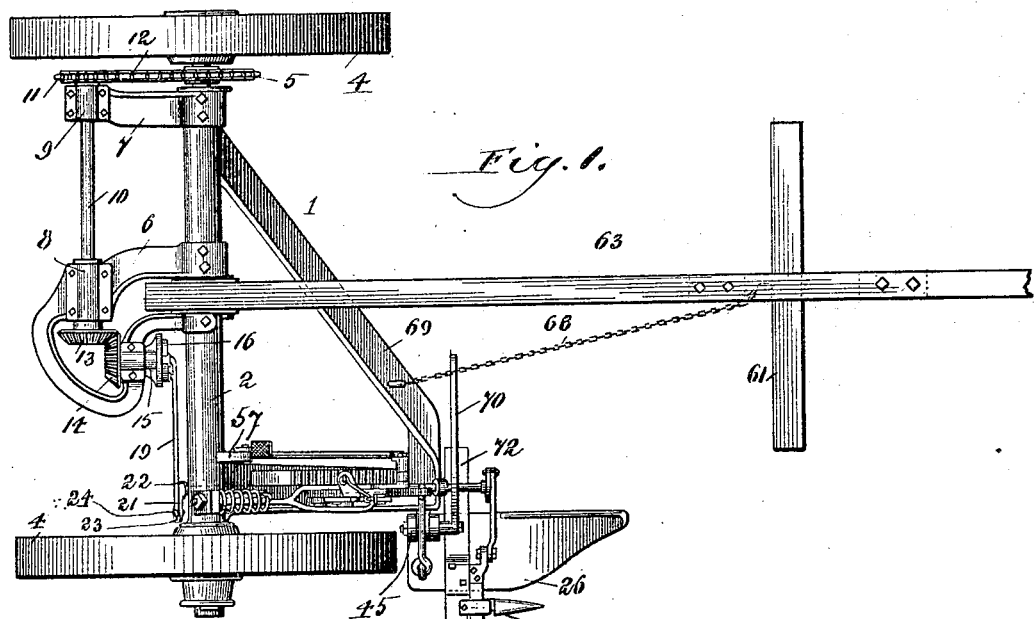
Figure 3:
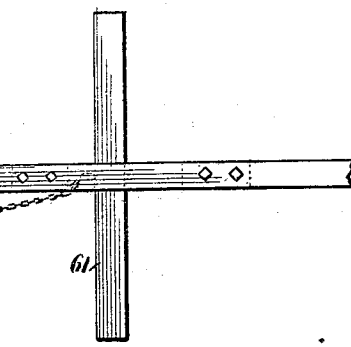
Figure 2:
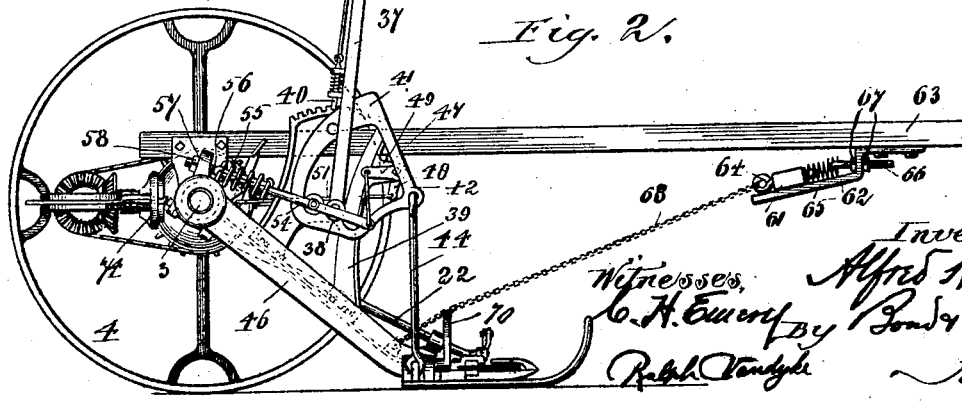

Figure 1 is a top or plan view. Fig. 2 is a side elevation, one wheel being removed. Fig. 3 is a detail, being a side elevation of the mechanism for operating the knives. Fig. 4 is an enlarged detail, being a side elevation of the lifting-levers. Fig. 5 is an enlarged detail, being a top view of the cutter-bar and knives. Fig. 6 is an enlarged detail, being a section on line 6 6 of Fig. 5; and Fig. 7 is a detail, being a top view of the driving-disk.

My invention relates to mowers; and the object of my invention is to improve the construction and operation of mowing-machines in several particulars, the most important of which relate to the draft-rod connections and the devices for lifting the cutter-bar.

I accomplish the object of my invention as illustrated in the drawings and as hereinafter specified.

That which I regard as new will be pointed out in the claims.

In the drawings, 1 indicates the main frame of the machine, which is of such shape as to be adapted to support the various parts of the mower. The different parts of the frame will be referred to more specifically hereinafter.

2 indicates a sleeve which forms part of the frame of the machine, which sleeve is adapted to fit upon an axle 3, upon which are mounted the usual wheels 4. The sleeve 2 is made somewhat shorter than the axle 3 in order to expose a small portion of the axle 3 near one of the wheels 4. Upon this exposed portion of the axle is mounted a sprocket-wheel 5, which is adapted to be locked to the axle, so that it will be operated by the rotation of the wheels 4. The usual clutch mechanism is provided for locking the wheel 5 to the axle 3.

6 indicates a two-armed bracket secured, as shown, substantially midway the ends of the sleeve 2 and provided in one arm with a bearing 8 and in the other arm with a bearing $8^a$, arranged at substantially right angles to the bearing 8.

7 indicates a bracket secured near one end of the sleeve 2 and like the bracket 6 extending back of the axle. The bracket 7 is provided with a bearing 9, lying in the same line with the bearing 8 of the bracket 6. Supported in the bearings 8 and 9 is a shaft 10, provided at one end with a sprocket-wheel 11, adjacent to and preferably smaller than the sprocket-wheel 5 and operated from said sprocket-wheel 5 by means of a chain 12. Carried by a small shaft journaled in the bearing $8^a$ of the bracket 6 is a pinion 14, which meshes with a pinion 13, mounted upon the contiguous end of the shaft 10.

While I have particularly described the construction of the bracket 6 shown in the drawings, I desire it understood that I do not confine myself to such particular form, it being sufficient that a suitable support be provided for the mechanism carried by said bracket 6 and the bracket 7.

16 indicates a disk which is rigidly secured to the inner end of the shaft 15, so that by the rotation of the axle 3 the disk 16 will be caused to rotate in a plane at right angles to the direction in which the mower is moving when the wheel 5 is locked to the axle 3. As best shown in Fig. 7, the disk 16 is provided with two slots or guideways 17, which are at right angles to each other and extend through the face of the disk.

74 indicates a balance-wheel which is connected to the disk at the back and is adapted by its momentum to render the rotation of the disk more uniform. The size of the balance-wheel may be varied as desired. In each guideway is fitted a block 18, which blocks are adapted to move across the face of the disk in their respective guides. The blocks 18 are connected together by means of a pitman 19, which is provided at or near one end with pins 20, which project at right angles from the pitman and are adapted to fit into suitable sockets in the blocks 18, as best shown in Fig. 7. The pins 20 are so arranged in relation to each other that by the rotation of the disk 16 the blocks 18 will be caused to move at right angles to each other in the guides 17. This will cause a reciprocation of the pitman.

The pitman 19 extends back of the axle and parallel with it to a point near the other wheel 4, where it is adjustably secured to the arm 21 of a rock-shaft 22, as best shown in Fig. 1. The arm 21 is provided with a slot 23, adapted to receive a bolt 24, whereby the pitman 19 may be secured to said arm at different points to vary the length of stroke of the rock-shaft. The rock-shaft 22 is used to operate the knives 23 and 24 of the mower, which are mounted upon a finger-bar 25, located as usual at one side of the driving mechanism and in front of the wheels 4. The inner end of the finger-bar 25 is secured to a broad shoe 26, which is of the usual shape and is adapted to run on the ground to aid in supporting the finger-bar. The shoe 26 is hinged at 45 to a portion of the frame 1 of the machine, which portion 46 extends downward and forward from one end of the sleeve 2 to a point slightly forward of the adjacent wheel 4, as best shown in Fig. 2. 73 indicates a smaller shoe, upon which is mounted the outer end of the finger-bar, which shoe serves as a runner to support the outer end of the finger-bar in the usual manner when the mower is in operation.

As heretofore constructed mowers have been provided with a single cutting blade or knife mounted upon a finger-bar having finger-shaped guards, into and out of which the knife was moved by suitable mechanism to cut the grass. In some respects this construction has been found to be unsatisfactory, especially in mowing grass which will not stand up before the action of the knife, such as dead or wilted grass, which would double on the edge of the section and pull into the guard. To avoid the objectionable features common to mowers of this class, I have provided a finger-bar having two knives operating in a guard. The knives 23 and 24 are both of the usual form, consisting of triangular sections secured to a back mounted in the finger-bar. The knives are placed in the finger-bar one upon the other and are adapted to be moved one upon the other. The points of the sections are protected by finger-shaped guards 27, which are secured at their rear ends to the under side of the finger-bar by bolts 28 or in any other suitable manner. The upper portion of the guards 27 may be of the ordinary semi-elliptical shape, having the broadest portion nearest the finger-bar, and the upper portion of each guard is broader than the under portion, so that its edges will hold the grass out in better position to be cut by the knives. The rear edges of the sections of the knives 23 and 24 are secured to cutter-bars 29 and 30, the sections of the upper knife 23 being secured to the under side of the bar 29 and the sections of the under knife being secured to the upper surface of the bar 30. The upper knife is therefore substantially similar to the knives ordinarily used, the under knife differing in having its bar on the under side of the sections and in the slightly-different shape of the sections. The bar 30 is adapted to fit into a seat 31 in the lower portion of the guard 27, and the bar 29 is adapted to fit into a similar seat 32 in clips 33, which are adapted to fit upon the upper side of the finger-bar and to be secured thereto to hold the knives in place. The clips 33 are preferably secured in place by the bolts which secure the guards to the finger-bar. As best shown in Fig. 6, the rear ends of the sections extend slightly back of the bars 29 and 30, which extended portions are adapted to fit into seats in the finger-bar, as best shown in Fig. 6. By this construction when the clips 33 are in place the strain upon the outer ends of the knives is taken up to a great extent by the finger-bar and clips 33. The weight of the upper knife is also sustained by the finger-bar and clips, so that little pressure falls upon the lower knife. The sections or teeth of the upper knife are preferably of the usual proportions and size. The edges of the sections of the under knife are more sharply inclined, making such sections about one-half the width of the sections of the upper knife at the base, as shown. The adjustment of the under knife 24 is such that when it is operated, as will be hereinafter more fully described, the points of the sections will never pass entirely out from under their respective guard-fingers. By this means the accumulation of grass or rubbish between the sections and the guard-fingers is prevented. The knife 23 is arranged to move back and forth upon the finger-bar over the lower knife, each section reciprocating between two adjacent guard-fingers.

The lower cutters are made narrower than the upper ones in order that the meeting-point of the cutting edges of the upper and lower knifes may move in a line parallel with the sides of the guard-fingers and at the same time provide for a short stroke of the lower knives, whereby the power thereof is greatly increased. By making the meeting-line of the cutting edges of the knives travel parallel with the sides of the guard-fingers said fingers are caused to support the grass during the cutting operation, thus making the machine more efficient, as the knives are less likely to become wedged and the grass is more easily cut.

As hereinbefore stated, the knives 23 and 24 are operated from the rock-shaft 22, which is provided at its lower end, opposite the inner ends of the knives, with a cross-head 34. Pitmen 35 and 36 connect the arms of the cross-head with the upper and lower knives, respectively, so that by the rocking of the cross-head upon the shaft 22 the knives will be moved upon the finger-bar in opposite directions. The knives will therefore operate in a scissors-like manner, and their adjustment is such that when the machine is in operation the line of meeting of the edges of the sections will move outward from the base of the sections to their points and in a direction about parallel with the upper edge of the guard-finger and a short distance from it. By this construction the knives are rendered much more effective for cutting all kinds of grass and the guards cannot become clogged up, as is frequently the case with mowers as heretofore constructed. To secure the proper proportionate movement of the knives, the cross-head 34 is so mounted upon the rock-shaft that the upper arm will be about three times the length of the lower arm. This will cause the upper knife to move nearly three times as far at each operation of the cross-head as the lower knife.

37 indicates a lever for lifting the finger-bar, which at its lower end is pivoted upon a short arm 38, which projects laterally from the front portion of a standard 39, which standard is suitably secured in an upright position to the frame of the machine, as best shown in Fig. 2. The upper portion of the standard 39 is curved and notched to form a rack adapted to receive a spring-pawl 40, mounted upon the lever 37 in the usual manner, for locking the lever 37 in different positions.

41 indicates an open bracket, which is of substantially the shape shown, having a curved rear inner side and having a forward extension 42, as best shown in Fig. 4. The bracket 41 is pivoted near the center of its lower portion upon the arm 38, upon which the lever 37 is mounted, and between the lever and the standard 39, as shown. By this construction the bracket is supported between the lever and the standard, which form guides to hold the bracket in an upright position.

43 indicates a pin which projects from the upper portion of the bracket 41 at about the point indicated in the drawings. It is not essential, however, that the pin 43 be placed in the exact position shown, as it may be placed in any other suitable position back of the lever 37, adapted to be engaged by said lever as it is moved backward. If desired, instead of a pin a lug may be cast upon the bracket 41. When the lever 37 is drawn back, it will bear against the pin 43 and will cause the bracket 41 to move back on its pivot, thereby raising the portion 42 of the bracket.

44 indicates a connecting-rod which connects the front of the bracket 41 with the shoe 26, near the outer edge of said shoe, as best shown in Fig. 1. By moving the bracket 41 backward on its pivot the shoe 26 will thereby be turned upon its hinge, throwing the finger-bar into a position more or less nearly perpendicular, the angle to which it is raised being determined by the position of the lever 37 and bracket 41. By this construction the outer end of the finger-bar may be raised to any desired angle by the lever 37 and may be locked in such position by the pawl 40.

47 and 48 indicate two short levers which are mounted at opposite sides of a stud 49, suitably located upon the standard 39, the levers 47 and 48 being mounted upon the opposite ends of a pin 50, which is suitably journaled in the stud 49, as best shown in Fig. 2. The lever 48 extends downward and is connected, by means of a rod 51, to a foot-lever 52, which is pivoted to a stud cast upon the frame of the machine at some suitable point. The lever 47 extends backward and is connected by a rod 53 to the end of a bar 54, which also extends backward to a point near the axle 3, and after passing through a coil-spring 55 is secured to the upper end of the spring. The lower end of the spring 55 is held by a rod 56, which also passes through the spring and is secured at its upper end to a stud 57, cast upon the sleeve 2, or is secured to the upper part of the frame 1 in any other suitable manner. The end of the rod 56 passes through the stud and is secured by a nut 58, which is adapted to be screwed upon its upper end. By moving the nut upon the rod 56 the tension of the spring 55 may be adjusted. The method of mounting the spring above described is that which I prefer to use; but, if desired, any method of mounting the spring to secure a spring tension upon the bar 54 may be used.

59 indicates a roller which is mounted upon a laterally-projecting pin 60 upon the bar 54, which roller is so located that when the bracket 41 is in the position shown in Fig. 2 the roller will rest at the bottom of the lower portion of the bracket, as shown in Fig. 4. In order to strengthen the bar 54, it is preferably made bifurcated, one portion passing upon each side of the bracket 41, as best shown in Fig. 1.

By the above-described construction and arrangement of the bracket 41 and roller 59 by pressing forward upon the foot-lever the lever 47 will be raised, which will cause the roller 59 to move upward in the bracket 41. This will lift the front portion of the bracket, and the finger-bar will be correspondingly raised. The lever 37, foot-lever 52, and bracket 41 are so arranged by constructing them as shown that the lever 37 and foot-lever 52 are entirely independent of each other in operation, so that either lever may be used to lift the finger-bar by operating the bracket 41. The foot-lever is best adapted for use when it is not desired to raise the finger-bar very high, as is necessary when the mower is being taken from one field to another; but when it is desired to raise the finger-bar temporarily and for a short distance, as to avoid stumps or other obstructions or in turning at the corners of a field, the foot-lever could be used for raising the finger-bar to a perpendicular position, if desired; but the lever 37 is best adapted for such use, as when the lever is used the finger-bar may be locked at any desired height. The spring 55 aids in lifting the finger-bar when the foot-lever is used and should be of sufficient strength to lift the greater part of the weight.

61 indicates the doubletree, which may be in general of the usual construction. It is supported at the center in a bracket 62, which is preferably of the shape shown in Fig. 2, and is secured at its forward end to the under side of the tongue 63. A slot (not shown) is provided which is adapted to receive a pin upon the under side of the doubletree, the arrangement being such that the pin will move in the slot to permit the doubletree to move lengthwise of the tongue.

64 indicates a bolt which passes through the center of the doubletree and is provided at its rear end with a ring, as shown. The front end of the pin or bolt 64 projects a short distance beyond the front of the bar, through which it passes, and extends into a spring 65, which is mounted in the bracket 62 in front of the doubletree. The spring 65 is held in position by the bolt 64 and a pin 66, which passes through the front of the bracket 62 and is adjustably secured therein by means of nuts 67, as best shown in Fig. 2. The spring is secured to the pin 66 by passing one end of it through an eye formed in the end of the pin; but it may be secured adjustably in the front of the bracket 62 in any other suitable manner. By adjusting the pin 66 in the bracket 62 by the nuts 67 the tension of the spring may be regulated as desired. Instead of having a bolt 64 extend through the bar at the center of the doubletree, as above described, a ring or staple may be secured at the rear side of the bar, and a cone adapted to fit into the end of the spring 65 may be secured to the other side of the bar, or any other suitable devices may be provided to adapt the doubletree to engage or bear against the spring when pulled forward.

68 indicates a flexible connection, preferably composed of a chain, which at its forward end is secured to the bolt 64 and at the other end is secured to the finger-bar-carrying frame composed of the member 46 and a bar 69, which is connected at its front end to the member 46 and at its rear end is pivoted upon the axle 3, as best shown in Fig. 1. The chain 68 passes over a bar or lever 70, which is pivotally secured at one end to the shoe 26, preferably at its hinge. The other end of the lever 70 extends under the chain 68 and may be secured thereto, and when the finger-bar 25 is resting upon the ground the end of the lever 70 is at such a height as to raise the chain slightly, as best shown in Fig. 2.

71 indicates an arm which extends downward from the lever 70 and is adapted to bear upon a lateral extension 72 of the shoe 26. The extension 72 may consist of a bar which projects laterally from the shoe and is rigidly secured thereto, or, if desired, it may be cast integral with the shoe. The arrangement of the arm 71 and bar 72 is such that when the lever 70 is depressed the arm 71 will bear down upon the bar 72, whereby the weight of the outer end of the finger-bar will be supported. By this construction in starting the mower the draft of the team is applied through the doubletree or equivalent draft device directly to the finger-bar-carrying frame, the tendency being to rock it upon the axle, raising its forward end with the shoe 26 and the inner end of the finger-bar. At the same time the weight of the finger-bar-carrying frame will afford sufficient resistance to the pull upon the chain 68 to cause the outer end of the finger-bar to be lifted slightly, owing to the downward pressure upon the lever 70 caused by the straightening of the chain 68. Thus the finger-bar will be lifted slightly both at its inner and outer ends. The knives and guards will thereby be broken free from any stiff grass or weeds with which they may have become engaged.

In the operation of starting the mower the inertia of the carriage and weight supported thereby affords so much resistance that when the draft of the team is first applied to the draft devices the first effect, as above stated, will be the rocking of the finger-bar-carrying frame and the lifting of the finger, the draft being transmitted directly to the finger-bar-carrying frame. Immediately upon the application of draft to the draft devices, however, they will move forward, compressing the spring 65, which will in turn transmit the draft to the tongue, starting the carriage. As soon as the machine has got under way less power will be required to move it. Consequently the spring 65 will expand, moving the draft devices back and permitting the finger-bar to return to its operative position. Part of the draft will, however, be applied directly to the finger-bar-carrying frame and part through the spring 65 to the tongue and carriage, so that a pushing as well as a pulling effect is secured. By this construction the pressure of the finger-bar upon the ground depends upon the amount of the draft applied directly to it, and this in turn depends upon the distance which the draft devices move before the draft is transmitted to the tongue and carriage. For the purpose of regulating the pressure of the finger-bar upon the ground I have provided means for regulating the longitudinal movement of the draft devices, such regulating mechanism consisting of the bolt 66, having the nuts 67, as shown in Fig. 2. Obviously by adjusting the bolt 66 to the left, as shown in Fig. 2, and thereby moving the spring 65 in the same direction the draft devices will move forward a less distance before transmitting the draft to the carriage than when the spring is in a position farther forward or to the right, as shown in Fig. 2. Consequently by moving the spring back or to the left the greater part of the pressure of the finger-bar will be on the ground, while by moving said spring forward or to the right more of the weight of the finger-bar will be sustained directly by the draft devices, and consequently it will bear more lightly upon the ground.

It should be understood that my invention is not limited to the specific devices shown for regulating the longitudinal movement of the draft devices, but includes equivalent mechanism, my invention being, broadly, the arrangement in a mower of a longitudinally-movable draft device arranged to transmit part of the power applied thereto to the finger-bar or finger-bar-carrying frame and part to the carriage, as well as the provision of draft devices operating, as stated, with means for regulating the proportionate part of the draft transmitted in each direction.

That which I claim as new, and desire to secure by Letters Patent, is—

1. In a harvesting-machine, the combination with a carriage, a vertically-swinging finger-bar-carrying frame and a finger-bar carried thereby, of a longitudinally-movable draft device, means for supporting said draft device, spring mechanism controlling the longitudinal movement of said draft device, and connecting means extending downward and back from said draft device to the lower forward portion of the finger-bar-carrying frame, substantially as described.

2. In a harvesting-machine, the combination with a carriage, a vertically-swinging finger-bar-carrying frame and a finger-bar carried thereby, of a draft device, connecting means extending downward and back from said draft device to the lower forward portion of the finger-bar-carrying frame for transmitting a part of the draft applied to said draft device to said finger-bar-carrying frame, and spring mechanism for transmitting to the carriage a part of the draft applied to said draft device, substantially as described.

3. In a harvesting-machine, the combination with a carriage, a finger-bar-carrying frame, and a finger-bar carried thereby, of a draft device, spring mechanism for transmitting a part of the draft applied to said draft device to the carriage, connecting means extending downward and back from said draft device to the lower forward portion of the finger-bar-carrying frame for transmitting a part of the draft to the finger-bar-carrying frame, and means for regulating the division of the draft between the carriage and the finger-bar-carrying frame, substantially as described.

4. In a harvesting-machine, the combination with a machine-frame, and a vertically-movable finger-bar, of a longitudinally-movable draft device, means operated by the longitudinal movement of said draft device to lift the finger-bar, and spring mechanism between the draft device and the machine-frame for limiting the longitudinal movement of the draft device and transmitting a part (more or less) of the draft applied thereto directly to the machine-frame, substantially as described.

5. In a harvesting-machine, the combination with a machine-frame having a tongue, of a vertically-movable finger-bar carried by the machine-frame, a draft device movable longitudinally of the tongue, adjusting mechanism carried by the tongue for regulating the extent to which said draft device may move longitudinally, and means for transmitting a part of the draft to the finger-bar when said draft device moves longitudinally, substantially as described.

6. In a harvesting-machine, the combination with a machine-frame, of a vertically-movable finger-bar carried thereby, a longitudinally-movable draft device, an adjustable stop for limiting the longitudinal movement of said draft device, and means for transmitting a part of the draft to the finger-bar when said draft device moves longitudinally, substantially as described.

7. In a harvesting-machine, the combination with a machine-frame, of a vertically-movable finger-bar carried thereby, a longitudinally-movable draft device, adjustable spring mechanism for regulating the extent to which said draft device may move longitudinally, and means for transmitting a part of the draft to the finger-bar when said draft device moves longitudinally, substantially as described.

8. In a harvesting-machine, the combination with a carriage, and a tongue connected thereto, of a rocking finger-bar-carrying frame, a longitudinally-movable draft device, a flexible connection connecting said draft device with said finger-bar-carrying frame, and adjustable mechanism carried by the tongue for regulating the extent to which said draft device may move longitudinally, substantially as described.

9. In a harvesting-machine, the combination with a carriage, and a tongue connected thereto, of a rocking finger-bar-carrying frame, a longitudinally-movable draft device, a flexible connection connecting said draft device with said finger-bar-carrying frame, and adjustable spring mechanism carried by the tongue for regulating the extent to which said draft device may move longitudinally, substantially as described.

10. In a harvesting-machine, the combination with a carriage, and a tongue connected thereto, of a rocking finger-bar-carrying frame, longitudinally-movable whiffletrees, a flexible connection connecting said whiffletrees with said finger-bar-carrying frame, a spring between said whiffletrees and the tongue, and means for adjusting said spring to regulate the extent to which said whiffletrees may move longitudinally, substantially as described.

11. In a mower, the combination with a finger-bar, the ends of which are supported by inner and outer shoes, cutting devices located in said finger-bar, and mechanism for operating said cutting devices, of a bracket 41 pivotally mounted in the frame of the mower, rod 44 connecting the forward end of the bracket 41 with the inner shoe of the cutter-bar, rod 54 secured at its rear end to the frame of the machine, a roller 59 mounted upon said rod 54 and adapted to move upon the inside surface of the bracket 41, and devices for raising the rod 54 to elevate the forward portion of the bracket 41, substantially as and for the purpose specified.

12. In a mower, the combination with a finger-bar supported by inner and outer shoes, bracket 41 pivotally mounted in the frame of the mower, the forward end of said bracket being connected to the inner shoe of the finger-bar, rod 54, and roller 59 adapted to move upon the inside surface of the bracket 41, of a foot-lever 52 mounted in the frame of the mower, and connecting-rod for connecting said foot-lever with the bar 54, whereby said bar may be raised or lowered by the operation of the foot-lever, substantially as and for the purpose specified.

13. In a mower, the combination with a finger-bar, inner and outer shoes supporting the ends of said finger-bar, bracket 41 pivotally mounted in the frame of the machine, said bracket being connected at its forward end to the inner shoe of the finger-bar, and rod 54, having roller 59 adapted to move upon the interior surface of the bracket 41, of a foot-lever 52, connecting-rod 51, levers 47 and 48, and connecting-rod 53 connecting the lever 47 and bar 54, substantially as and for the purpose specified.

14. In a mower, the combination with a finger-bar-carrying frame, a shoe hinged thereto and a finger-bar secured to said shoe, of a tongue, whiffletrees mounted on said tongue and adapted to move longitudinally thereof, a chain connecting said whiffletrees with the finger-bar-carrying frame of the mower, and a lever secured to said shoe and projecting under the chain, whereby the finger-bar is raised by the forward motion of the whiffletree, substantially as described.

15. In a mower, the combination with a finger-bar and inner and outer shoes supporting said finger-bar, said inner shoe having a lateral projection 72, of a tongue 63, doubletree 61 supported at the under side of said tongue, said doubletree being movable longitudinally of the tongue, a spring 65 adapted to limit the forward motion of said doubletree, chain 68 connecting said doubletree and the front portion of the frame of the mower, a lever 70 secured at one end to the inner shoe, and projecting under the chain 68 in such position as to normally hold the chain in a raised position, said bar having a downwardly-projecting arm 71 adapted to bear upon the extension 72 of the shoe, whereby the cutter-bar will be slightly raised by the forward motion of the doubletree, substantially as described.

16. In a mower, the combination with a finger-bar, the ends of which are supported by inner and outer shoes, cutting devices located in said finger-bar, and mechanism for operating said cutting devices, of a bracket 41 pivotally mounted in the frame of the mower, a rod connecting the forward end of the bracket 41 with the inner shoe of the cutter-bar, rod 54, having a roller 59 mounted upon it and adapted to move upon the inside surface of the bracket 41, a spring connecting the inner end of the rod 54 to the frame of the machine, and a foot-lever adapted to be operated to raise the rod 54, whereby the spring will operate to raise the forward end of the bracket 41, substantially as and for the purpose specified.

ALFRED HART.

Witnesses:
A. H. ADAMS,
NELLIE McKIBBEN.